(12) United States Patent
Charpie

(10) Patent No.: US 7,509,864 B2
(45) Date of Patent: Mar. 31, 2009

(54) PAINT SPRAY GUN WITH DIGITAL PRESSURE GAUGE AND RELATIVE HUMIDITY INDICATOR REMOVABLY MOUNTED THEREON

(75) Inventor: Mark E. Charpie, Ottawa Lake, MI (US)

(73) Assignee: Illinois Tool Works Inc,, Glenview, IL (US)

( * ) Notice: Subject to any disclaimer, the term of this patent is extended or adjusted under 35 U.S.C. 154(b) by 97 days.

(21) Appl. No.: 11/730,855

(22) Filed: Apr. 4, 2007

(65) Prior Publication Data

US 2008/0011872 A1 Jan. 17, 2008

Related U.S. Application Data

(60) Provisional application No. 60/794,095, filed on Apr. 24, 2006.

(51) Int. Cl.
*G01L 7/00* (2006.01)
*B05B 7/30* (2006.01)

(52) U.S. Cl. .................. 73/714; 73/29.04; 239/346
(58) Field of Classification Search ..... 73/29.01–29.04, 73/700–756; 239/346
See application file for complete search history.

(56) References Cited

U.S. PATENT DOCUMENTS 3,546,922 A 12/1970 Dreckmann
5,191,797 A 3/1993 Smith
6,010,082 A 1/2000 Peterson
6,585,173 B2 * 7/2003 Schmon et al. ............. 239/526
7,181,953 B1 2/2007 Street
2003/0230636 A1 12/2003 Rogers
2005/0199403 A1 9/2005 Arno et al.

FOREIGN PATENT DOCUMENTS

WO WO 2005082544 9/2005

* cited by examiner

*Primary Examiner*—Edward Lefkowitz
*Assistant Examiner*—Jermaine Jenkins
(74) *Attorney, Agent, or Firm*—Law Offices of Steven W. Weinrieb

(57) ABSTRACT

A new and improved combination pressure gauge and relative humidity indicator for use upon a compressed air or gas too, such as, for example, a paint spray gun, comprises a housing within which a pressure transducer, for determining the pressure level of the incoming compressed air or gas, and a humidity sensor, for determining the relative humidity of the incoming compressed air or gas, are disposed and contained. A first end portion of the housing has a first coupling mounted thereon for connection to an inlet port coupling of the paint spray gun, while a second end portion of the housing has a second coupling mounted thereon for connection to a compressed air or gas line of a compressed air or gas supply source. In this manner, the combination pressure gauge and relative humidity indicator can be readily incorporated within the fluid flow line of the compressed air or gas so as to be separably and independently useable with any compressed air or gas tool.

17 Claims, 1 Drawing Sheet

PAINT SPRAY GUN WITH DIGITAL PRESSURE GAUGE AND RELATIVE HUMIDITY INDICATOR REMOVABLY MOUNTED THEREON

CROSS-REFERENCE TO RELATED PATENT APPLICATION

This patent application is related to, based upon, and effectively a utility patent application conversion from U.S. Provisional Patent Application Ser. No. 60/794,095, which was filed on Apr. 24, 2006, the filing date benefits of which are hereby incorporated by reference.

FIELD OF THE INVENTION

The present invention relates generally to paint spray guns, and more particularly to a new and improved paint spray gun which has a digital pressure gauge and relative humidity indicator removably connected to the air inlet end of the paint spray gun whereby as a result of the provision of the digital pressure gauge upon the paint spray gun at the air inlet end of the paint spray gun, the atomization pressure of the incoming compressed air can be accurately controlled so as to accurately control the color of the paint being sprayed onto a substrate, and in a similar manner, as a result of the provision of the digital relative humidity indicator upon the paint spray gun at the air inlet end of the paint spray gun, the relative humidity of the incoming compressed air measured so as to ensure that water vapor condensation will not occur within the compressed air, which would adversely affect the composition or consistency of the paint being sprayed onto the substrate, whereby the overall productivity would effectively be compromised or adversely affected in view of the fact that the painted substrate would have to be repainted with paint in accordance with the desired specifications. The removable connection permits the digital pressure gauge and relative humidity indicator to be inserted into the air line and used with any existing paint spray gun.

BACKGROUND OF THE INVENTION

In connection with the use of, for example, paint spray guns, compressed air or gas is normally used as a propellant for atomizing and discharging paint material from the paint spray gun. It is known, however, that compressed air or gas produced by means of conventional compressor apparatus normally has a relative humidity value that may be within the range of, for example, 50-100%. When the compressed air or gas is characterized by means of such a relatively high level of relative humidity, there is a relatively high likelihood that moisture or water vapor condensation will occur or be present within the various operational components comprising the compressed air or gas feed system, such as, for example, the various compressed air or gas lines, the compressed air or gas line fittings, the compressed air or gas regulation devices, or the like. In any case, it is desirable to lower the relative humidity values of the compressed air or gas by effectively removing the moisture content from, or reducing the moisture content within, the incoming compressed air or gas so that water vapor condensation does not in fact occur. This is particularly desirable in connection with the use of paint spray guns because otherwise, the moisture or water vapor condensation will be entrained within the sprayed paint thereby rendering the paint material composition unacceptable from the viewpoint of its desired, intended, or required specifications.

In order to achieve the aforenoted elimination or reduction in the relative humidity or moisture content within the incoming compressed air or gas, air or gas drying systems comprising, for example, refrigerated, adsorbent, or absorbent type dryer mechanisms, are conventionally employed in connection with the source of the compressed air or gas. Such systems are quite effective and are even capable of drying compressed air or gas to below-zero dew point levels. However, notwithstanding the use of such drying systems, there is no guarantee that the compressed air or gas being conveyed through the system will have the requisite relative humidity values, levels, or characteristics at the actual end point of use, that is, at the inlet to the paint spray gun where the incoming compressed air or gas will now mix with and entrain the paint material within the fluid stream. Therefore, not only can moisture or water condensation be present or occur within any one or more of the aforenoted various operational components comprising the compressed air or gas feed system, such as, for example, the various compressed air or gas lines, the compressed air or gas line fittings, the compressed air or gas regulation devices, or the like, but in addition, at any point in time, the drying system may lose some of its effectiveness or efficiency due to, for example, a malfunction, the exhaustion or depletion of its treatment materials, or the like.

Still yet further, even if the drying system is working satisfactorily or optimally, moisture or water vapor, derived or originating from other sources, may nevertheless become entrained or entrapped within the operational compressed air or gas infeed system and may present themselves during the actual paint spraying process or operation. For example, during a particular paint spraying application, the lengthy compressed air or gas lines or hoses may need to be disconnected, exchanged, replaced, reconnected, or the like. Each time one of the hoses or lines is in fact disconnected and subsequently reconnected, unwanted and undesirable moisture-laden ambient air can or will be admitted into the system and will therefore be conveyed through the system, mixing with the paint material being entrained thereby, until it is ultimately exhausted or discharged from the paint spray gun and eventually replaced with treated compressed air or gas coming from the compressed air or gas source. As has been noted hereinbefore, moisture or water vapor condensation entrained within the sprayed paint is unwanted and undesirable in that the same renders the paint material composition unacceptable from the viewpoint of its desired, intended, or required specifications. Under such circumstances, and in accordance with any one of the foregoing modes of operation, that is, whether the air or gas drying system is not working optimally, or just as a result of the inherent operational or structural characteristics of the overall system, operator personnel may not even realize that such contaminated sprayed paint is in fact being discharged from the paint spray gun in view of the fact that the operator may be operating, in effect, under a false sense of security in that the source of the compressed air or gas does have the air or gas drying systems operatively associated therewith. Continuing still further, it is also important, in connection with the use of paint spray guns, that the pressure of the incoming compressed air or gas be regulated and monitored so as to ensure that the pressure is in fact at a desired or specified value. The pressure level of the incoming compressed air or gas is important because the amount of paint entrained within the compressed air or gas stream is a function of the pressure level of the compressed air or gas. Accordingly, depending upon the pressure level of the compressed air or gas, the color of the paint expelled or discharged from the paint spray gun and applied onto the particular substrate can vary. Therefore, it is imperative that for a particular spray paint application, the pressure of the incoming compressed air or gas must be maintained at a predetermined value.

Continuing further, then, while pressure gauges have in fact been utilized in conjunction with paint spray guns for measuring and monitoring the pressure level of the incoming compressed air or gas, as exemplified by means of U.S. Pat. No. 5,191,797 which was issued to Smith on Mar. 9, 1993, as well as United States Patent Application Publication 2003/0230636 which was published in the name of Rogers on Dec. 18, 2003, and while a dryness indicator is also disclosed within United States Patent Application Publication 2005/0199403 which was published in the name of Arno et al. on Sep. 15, 2005, to date there is no single piece of equipment or apparatus which effectively comprises a composite or combination pressure gauge and relative humidity indicator which can conveniently and readily be utilized in conjunction with a paint spray gun in order to provide the operator with current or up-to-date accurate or precise pressure and relative humidity readings, values, or levels so that the operator can in fact continuously monitor the pressure and relative humidity levels of the incoming compressed air or gas whereby necessary corrective steps or action can be taken, such as, for example, the altering or adjusting of the pressure level of the incoming compressed air or gas, or the temporary stoppage of the operation of the paint spray gun while the operation of the drying system is checked. In this manner, the proper operation of the paint spray gun can be ensured to the effect that the paint being sprayed by means of the paint spray gun is precisely controlled from the viewpoints of paint color, paint consistency, and the like.

In addition, it is also noted that the aforenoted pressure gauges and dryness indicator components are integrally incorporated upon or within the handle structure or housing of the paint spray gun. This is not particularly desirable from an operational point of view because if the pressure and dryness of the incoming compressed air or gas is desired to be measured, monitored, and controlled in connection with a paint spraying operation, only those tools or paint spray guns, which are equipped with the pressure gauges or dryness indicator of the types disclosed within the aforenoted patent publications, can be used. Viewed from a different perspective, if a particular user, whether an individual, already having one or more paint spray guns which are not equipped with the pressure gauges or dryness indicator of the types disclosed within the aforenoted patent publications, or a business, having a multiplicity of paint spray guns which are likewise not equipped with the pressure gauges or dryness indicator of the types disclosed within the aforenoted patent publications, want to perform a paint spraying operation under precisely or accurately controlled pressure and dryness conditions in order to attain the desired paint deposition results in connection with color, consistency, and the like, they will not be able to do so because the pressure gauges or dryness indicator, as disclosed within the aforenoted patent publications, cannot be mounted or affixed upon existing paint spray guns. In order for the individual or company to reap the benefits of being able to measure and monitor the pressure level and dryness of the incoming compressed air or gas, they must therefore in fact purchase or use the particular paint spray guns disclosed within the aforenoted patent publications.

A need therefore exists in the art for a new and improved combination digital pressure gauge and relative humidity indicator which can readily be mounted or affixed upon any paint spray gun in order to provide the operator with immediate and accurate pressure and relative humidity readings, values, or levels so that the operator can in fact continuously monitor the pressure and relative humidity levels of the incoming compressed air or gas whereby necessary corrective steps or action can be taken, such as, for example, altering or adjusting the pressure level of the incoming compressed air or gas, or temporarily stopping the operation of the paint spray gun so that the operation of the drying system can be assessed or checked as to whether or not the drying system is operating properly, whether or not the drying system needs to be repaired or replaced, or the like. These remedial measures can be taken so as to ensure that the paint being discharged or sprayed is precisely controlled from the viewpoints of paint color, paint consistency, and the like.

SUMMARY OF THE INVENTION

The foregoing and other objectives are achieved in accordance with the teachings and principles of the present invention through the provision of a new and improved combination pressure gauge and relative humidity indicator which comprises a housing within which a pressure transducer for determining the pressure level of the compressed air or gas, and a humidity sensor for determining the relative humidity of the compressed air or gas, are disposed and contained. In addition, a first end portion of the housing has a first, internally threaded coupling fixedly mounted thereon which is adapted for threaded connection to an externally threaded compressed air or gas inlet port defined upon the paint spray gun, while a second end portion of the housing has a second, externally threaded coupling fixedly mounted thereon which is adapted for threaded connection to an internally threaded coupling disposed upon the output or downstream end of a compressed air or gas hose or line which is connected at its opposite or upstream end to the source of compressed air or gas. In this manner, it can be readily appreciated that the new and improved combination pressure gauge and relative humidity indicator of the present invention can effectively be incorporated within the fluid flow line of the compressed air or gas at the point at which the compressed air supply hose or line is threadedly connected to the compressed air inlet port of the paint spray gun. In this manner, it can be further appreciated that the new and improved combination pressure gauge and relative humidity indicator of the present invention can be used in connection with any existing paint spray gun. Accordingly, if an individual or business already has an existing supply of paint spray guns, they can, in effect, be readily adapted for use with the new and improved combination pressure gauge and relative humidity indicator of the present invention whereby any operator will be immediately supplied with accurate pressure and relative humidity readings, values, or levels so that the operator can in fact continuously monitor the pressure and relative humidity levels of the incoming compressed air or gas in order to ensure that the paint being sprayed and discharged from the paint spray gun will achieve the desired color and consistency specifications.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
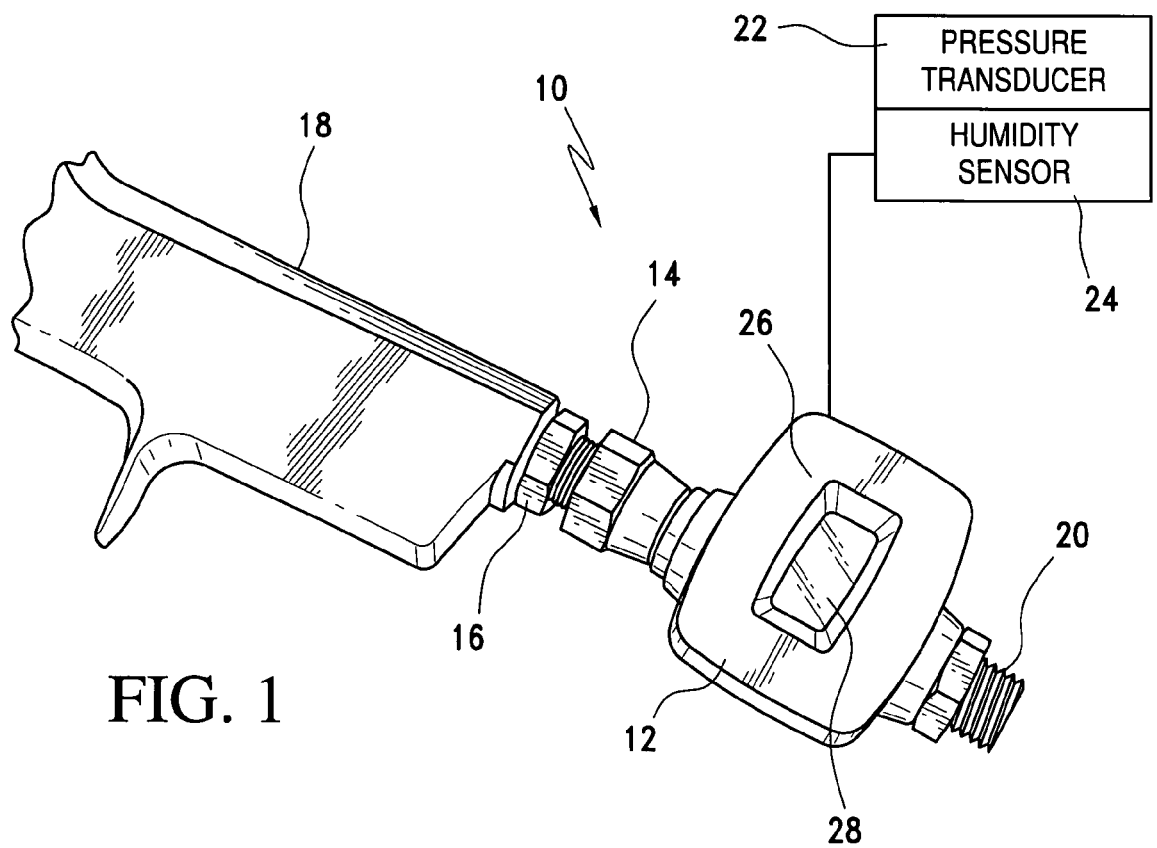
FIG. 1 is a perspective view of a new and improved combination digital pressure gauge and relative humidity indicator assembly which has been constructed in accordance with the principles and teachings of the present invention, and which is illustrated as being operatively connected to the handle housing of a paint spray gun so as to effectively establish with, render, or convert an existing paint spray gun into a new and improved paint spray gun.

Referring now to the drawings, and more particularly to FIG. 1 thereof, a new and improved combination digital pressure gauge and humidity indicator assembly, which has been constructed in accordance with the principles and teachings of the present invention, is disclosed and is generally indicated by the reference character 10. More particularly, it is seen that the combination digital pressure gauge and humidity indicator 10 is seen to comprise a housing 12 which has, for example, the configuration of a rectangular parallellelepiped. A first, internally threaded female connector or coupling 14 is fixedly or integrally formed or provided upon a first end portion of the digital pressure gauge and humidity indicator housing 12 so as to be capable of being threadedly connected to an externally threaded, male, compressed air inlet port connector or coupling 16 disposed upon a handle portion 18 of a compressed air or gas tool, such as, for example, a paint spray gun, while a second, externally threaded male connector or coupling 20 is fixedly or integrally formed or provided upon a second end portion of the digital pressure gauge and humidity indicator housing 12 so as to be capable of being threadedly connected to an internally threaded, female connector or coupling, not shown, which will be disposed upon a downstream end portion of a compressed air or gas hose or line, not shown, whereby compressed air or gas from a compressed air or gas supply source, also not shown, will be able to be supplied to the compressed air or gas tool.

In addition to the aforenoted structure, it is to be appreciated that internally within the digital pressure gauge and humidity indicator housing 12, there is disposed a suitable pressure transducer, which is schematically illustrated at 22, for determining the pressure level of the incoming compressed air or gas, and a suitable humidity sensor, which is schematically illustrated at 24, for determining the relative humidity of the incoming compressed air or gas. In addition, the upper face 26 of the digital pressure gauge and humidity indicator housing 12 also comprises a display window 28 within which first and second digital readouts of the pressure level and humidity percentage values can be respectively displayed. While a single display window 28 is illustrated within FIG. 1, it is to be further appreciated that a pair of separate windows can of course be provided within the upper face 26 of the digital pressure gauge and humidity indicator housing 12 so as to respectively digitally display the pressure level and humidity percentage values within their own display windows.

Figure 2:
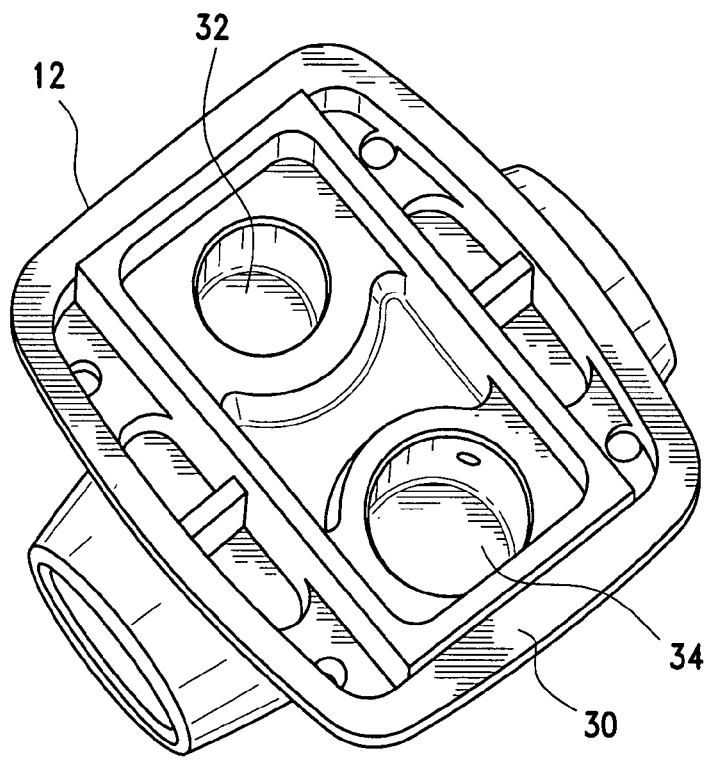
FIG. 2 is a interior perspective view of one half of a housing, which can be similar to the housing illustrated within FIG. 1, illustrating the two recessed pocket structures which can be utilized for respectively housing or accommodating the pressure gauge and humidity indicator components of the new and improved combination digital pressure gauge and relative humidity indicator assembly which has been constructed in accordance with the principles and teachings of the present invention.

Still further, as illustrated within FIG. 2, the housing 12 can be fabricated from housing half sections which are adapted to be fixedly secured together, of which one half section 30 is illustrated, and it is seen that internally within, for example, at least the housing half section 30, there is provided a pair of recessed pocket structures 32,34 which are structured so as to respectively house or accommodate the pressure transducer 22 and the humidity sensor 24. In connection with the operation of the pressure transducer 22, it is to be noted that in order to function properly, the pressure transducer 22 needs only to be exposed to the pressure of the compressed air or gas flow, while in connection with the operation of the relative humidity sensor 24, the compressed air or gas must actually flow past the same. The relative humidity sensor 24 can comprise, for example, a relative humidity sensor manufactured by HUMIREL INC. of Phoenix, Ariz., such as, for example, their Model HS1101 or HS1100.

Continuing further, it is to be additionally appreciated that in accordance with the principles and teachings of the present invention, and contrary to the known prior art, the new and improved combination digital pressure gauge and humidity indicator 10 of the present invention comprises a self-contained structural component which is separable from and independent of the compressed air or gas tool as a result of being capable of being inserted into and removed from the compressed air or gas fluid flow line which is defined between the supply source of the compressed air or gas, not shown, and the externally threaded, male, compressed air inlet port connector or coupling 16 disposed upon the handle portion 18 of the compressed air or gas tool. More particularly, as a result of being separably connectable to the handle portion 18 of the compressed air or gas tool by means of the coupling together of the first, internally threaded female connector or coupling 14 of the digital pressure gauge and humidity indicator housing 12 and the externally threaded, male, compressed air inlet port connector or coupling 16 disposed upon the handle portion 18 of the compressed air or gas tool, as well as the coupling together of the second, externally threaded male connector or coupling 20 of the digital pressure gauge and humidity indicator housing 12 and the internally threaded, female connector or coupling, not shown, disposed upon the downstream end portion of the compressed air or gas hose or line, also not shown, the new and improved combination digital pressure gauge and humidity indicator 10 of the present invention is capable of being utilized in conjunction with any existing compressed air or gas tool simply by effectively inserting the same into the fluid flow line as a result of the aforenoted coupling connections. Therefore, operators desirous of performing, for example, paint spraying operations utilizing a paint spray gun being operated by means of compressed air or gas, will be able to perform a reliable paint spraying operation by means of, for example, a compressed air or gas tool, such as, for example, a paint spray gun, to which the new and improved combination digital pressure gauge and humidity indicator 10 of the present invention has been operatively connected whereby the pressure and humidity levels characteristic of the incoming compressed air or gas can be accurately and precisely measured, monitored, and controlled. It is of course to be further appreciated that the compressed air or gas tool, or the digital pressure gauge and humidity indicator housing 12, may be operatively connected to, or provided with, suitable pressure regulator devices, not shown, for regulating the pressure of the incoming compressed air or gas, as well as drying systems for regulating the humidity or moisture content of the incoming compressed air or gas, in accordance with the digital pressure and humidity values read out or displayed within the one or more windows 28 incorporated within the digital pressure gauge and humidity indicator housing 12.

Thus, it may be seen that in accordance with the principles and teachings of the present invention, there has been provided a new and improved combination pressure gauge and relative humidity indicator which comprises a housing within which a pressure transducer for determining the pressure level of the compressed air or gas, and a humidity sensor for determining the relative humidity of the compressed air or gas, are disposed and contained. In addition, a first end portion of the housing has a first, internally threaded female coupling or connector fixedly mounted thereon which is adapted for threaded connection to an externally threaded, male, compressed air or gas inlet port connector or coupling defined upon the paint spray gun, while a second end portion of the housing has a second, externally threaded male coupling or connector fixedly mounted thereon which is adapted for threaded connection to an internally threaded, female coupling or connector disposed upon the output or downstream end of a compressed air or gas hose or line which is fluidically connected at its opposite or upstream end to the source of compressed air or gas.

In this manner, it can be readily appreciated that the new and improved combination pressure gauge and relative humidity indicator of the present invention can readily and effectively be incorporated within the fluid flow line of the compressed air or gas at the point at which the compressed air supply hose or line is threadedly connected to the compressed air inlet port of the paint spray gun. Furthermore, it can also be appreciated that the new and improved combination pressure gauge and relative humidity indicator of the present invention can be used in connection with any existing paint spray gun. Accordingly, if an individual or business already has an existing supply of paint spray guns, they can, in effect, be readily adapted for use with the new and improved combination pressure gauge and relative humidity indicator of the present invention whereby any operator will be immediately supplied with accurate pressure and relative humidity readings, values, or levels so that the operator can in fact continuously monitor the pressure and relative humidity levels of the incoming compressed air or gas in order to ensure that the paint being sprayed and discharged from the paint spray gun will achieve the desired color and consistency specifications.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A combination pressure gauge and humidity indicator assembly for use with a tool which is adapted to be connected to a source of compressed fluid, comprising:
   a housing;
   a pressure gauge disposed within said housing;
   a relative humidity indicator disposed within said housing;
   a first coupling member disposed upon a first section of said housing for separable connection to the compressed fluid operative tool; and
   a second coupling member disposed upon a second section of said housing for separable connection to the source of compressed fluid,
   whereby said combination pressure gauge and humidity indicator can be used with any compressed fluid operative tool by inserting said combination pressure gauge and humidity indicator within the fluid line extending from the source of compressed fluid to the compressed fluid operative tool, such that said combination pressure gauge and humidity indicator will be interposed between the compressed fluid operative tool and the source of compressed fluid, as a result of the respective connection of said first and second coupling members to the compressed fluid operative tool and to the source of compressed fluid so as to fluidically connect the compressed fluid operative tool to the source of compressed fluid.

2. The combination as set forth in claim 1, wherein:
   said pressure gauge disposed upon said housing comprises a digital read-out of pressure values.

3. The combination as set forth in claim 2, wherein:
   said relative humidity indicator disposed upon said housing comprises a digital read-out of relative humidity values.

4. The combination as set forth in claim 3, further comprising:
   at least one window formed within a face of said housing wherein said pressure values and said relative humidity can be displayed.

5. The combination as set forth in claim 4, wherein:
   said pressure gauge comprises a pressure transducer for determining the pressure value of the compressed fluid and for converting the determined pressure value of the compressed fluid into a displayed pressure value.

6. The combination as set forth in claim 1, wherein:
   said relative humidity indicator comprises a relative humidity sensor for determining the relative humidity value of the compressed fluid and for converting the determined relative humidity value of the compressed fluid into a displayed relative humidity value.

7. The combination as set forth in claim 6, wherein:
   said housing comprises a housing structure which comprises a pair of half housing sections fixedly secured together.

8. The combination as set forth in claim 7, wherein:
   at least one of said pair of half housing sections comprises a pair of recessed sockets for respectively housing said pressure transducer and said relative humidity sensor.

9. In combination, a compressed fluid operative tool and a combination pressure gauge and humidity indicator for use with said compressed fluid operative tool, comprising:
   a tool having a compressed fluid inlet coupling which is adapted to be fluidically connected to a source of compressed fluid so as to use the compressed fluid as an operative component; and
   a combination pressure gauge and humidity indicator for use in conjunction with said compressed fluid operative tool;
   said combination pressure gauge and humidity indicator comprising a housing; a pressure gauge disposed upon said housing; a relative humidity indicator disposed upon said housing; a first coupling member disposed upon a first section of said housing for separable connection to said compressed fluid inlet coupling of said tool; and a second coupling member disposed upon a second section of said housing for separable connection to the source of compressed fluid;
   whereby said combination pressure gauge and humidity indicator can be used with any compressed fluid operative tool by inserting said combination pressure gauge and humidity indicator within the fluid line extending from the source of compressed fluid to said compressed fluid operative tool, such that said combination pressure gauge and humidity indicator will be interposed between said compressed fluid operative tool and the source of compressed fluid, as a result of the respective connection of said first and second coupling members to said compressed fluid operative tool and to the source of compressed fluid so as to fluidically connect said compressed fluid operative tool to the source of compressed fluid.

10. The combination as set forth in claim 9, wherein:
said tool comprises a spray paint gun.

11. The combination as set forth in claim 9, wherein:
said pressure gauge disposed upon said housing comprises a digital read-out of pressure values.

12. The combination as set forth in claim 11, wherein:
said relative humidity indicator disposed upon said housing comprises a digital read-out of relative humidity values.

13. The combination as set forth in claim 12, further comprising:
at least one window formed within a face of said housing wherein said pressure values and said relative humidity can be displayed.

14. The combination as set forth in claim 13, wherein:
said pressure gauge comprises a pressure transducer for determining the pressure value of the compressed fluid and for converting the determined pressure value of the compressed fluid into a displayed pressure value.

15. The combination as set forth in claim 14, wherein:
said relative humidity indicator comprises a relative humidity sensor for determining the relative humidity value of the compressed fluid and for converting the determined relative humidity value of the compressed fluid into a displayed relative humidity value.

16. The combination as set forth in claim 15, wherein:
said housing comprises a housing structure which comprises a pair of half housing sections fixedly secured together.

17. The combination as set forth in claim 16, wherein:
at least one of said pair of half housing sections comprises a pair of recessed sockets for respectively housing said pressure transducer and said relative humidity sensor.

* * * * *